July 12, 1949.  L. A. WILLIAMS, JR  2,476,171
SMOKE SCREEN GENERATOR
Filed July 18, 1945  2 Sheets-Sheet 1
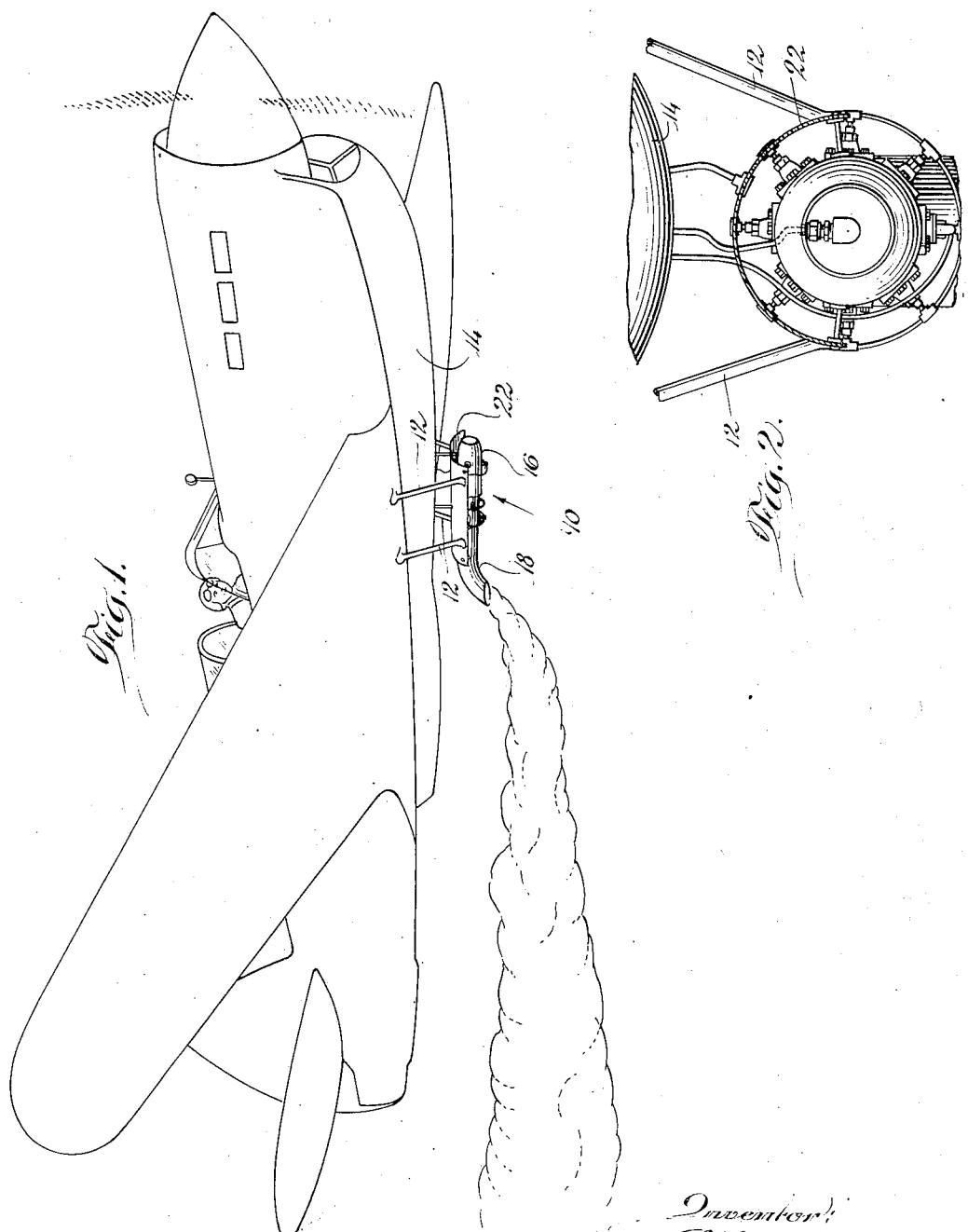

July 12, 1949.　　　L. A. WILLIAMS, JR　　　2,476,171
SMOKE SCREEN GENERATOR
Filed July 18, 1945　　　　　　　　　　　　2 Sheets—Sheet 2
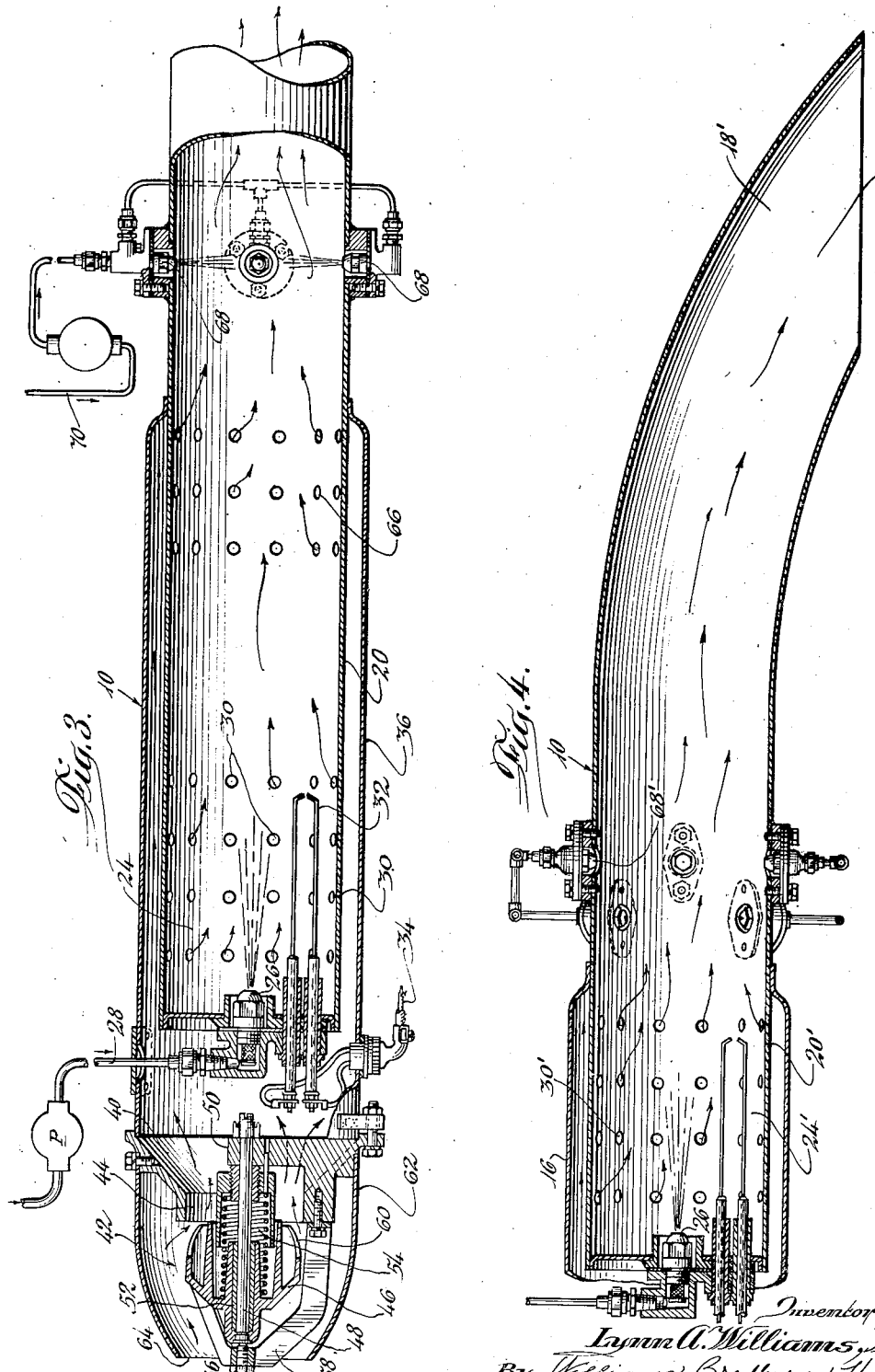
Inventor:
Lynn A. Williams, Jr.
By Williams, Bradbury & Hinkle
Attorneys.

Patented July 12, 1949

2,476,171

UNITED STATES PATENT OFFICE 2,476,171

SMOKE SCREEN GENERATOR

Lynn A. Williams, Jr., Northfield, Ill., assignor to Stewart-Warner Corporation, Chicago, Ill., a corporation of Virginia Application July 18, 1945, Serial No. 605,688

10 Claims. (Cl. 244—136)

My invention relates to smoke screen generators, and is more particularly concerned with a smoke screen generator adapted for use on aircraft.

In present practice a smoke screen is produced by an aircraft by feeding a light oil, such as S. A. E. 20 or 30 into the exhaust manifold of the aircraft engine. The oil is there vaporized and condenses into droplets upon contact with the air after issuing from the exhaust pipe to form the desired smoke screen. Accurate control of the smoke screen is difficult, if not impossible, however, due to variations in the quantity and temperature of the exhaust gases occasioned by variations in the power output of the engine.

An object of my invention is to provide a smoke screen generator which is not dependent upon variations in power output of the aircraft engine and which may be accurately controlled and efficiently operated under all conditions.

Another object of my invention is to provide a new and improved smoke screen generator which is light and efficient, and which can easily be installed on existing aircraft.

Another object of my invention is to provide a new and improved smoke screen generator which automatically compensates for variations in speed and altitude to provide uniform results for all speeds and altitudes.

Other objects and advantages will become apparent as the description proceeds.

In the drawings Figure 1 is a perspective view of an airplane having a preferred form of my invention applied thereto;

Figure 2 is a front end view of the generator and associated parts shown in Figure 1;

Figure 3 is a partial longitudinal section through one form of my invention, and Figure 4 is a partial longitudinal section through a preferred modification of the form shown in Figure 3.

In Figures 1 and 2 I have shown my novel smoke screen generator indicated generally by reference character 10 as being attached by diagonal struts 12 beneath the fuselage 14 of a conventional aircraft. The generator comprises in general a tubular member 16 having a curved outlet end 18. A semi-cylindrical shell 22 is interposed between the generator and the under body of the airplane to prevent heat radiation from the generator to the airplane structure.

The generator proper is shown more clearly in Figure 3 and comprises a cylinder 20 providing a combustion chamber 24 into which gasoline or other liquid fuel is sprayed through a nozzle 26. A pipe 28 connects the nozzle 26 with the pump P or any other suitable source of fuel under pressure. Air enters the combustion chamber 24 through a multiplicity of openings 30 formed in the cylinder 20, and this air mixes with the sprayed fuel to form a combustible mixture which is ignited by a spark type igniter 32 connected by wiring 34 with the ignition system of the aircraft engine or with a separate make and break coil and source of electrical energy as may be most suitable for any particular installation.

The cylinder 20 is surrounded throughout part of its length by an air supply tube 36 having secured thereto at its forward end the stationary member 40 of an air inlet valve indicated generally by reference character 42. The stationary member 40 has a flaring portion attached to the forward end of the tube 36 and a forwardly extended air inlet 44 of materially smaller diameter than the tube 36. A movable valve member 46 automatically regulates the amount (weight) of air entering the inlet 44. This movable member 46 is slidable on a stationary guide rod 48 mounted on an inwardly extending finger 50 of the stationary member 40, a bearing sleeve 52 being preferably provided to reduce wear and friction.

A spring 54 urges the movable member 46 toward an adjustable stop 56 carried in a yoke 58 attached to the stationary member 40. The movable valve member 46 has a pair of oppositely disposed irregular but generally V-shaped notches 60 which cooperate with the inlet 44 to control the admission of air to the tube 36. The valve members 40 and 46 are surrounded by a sheet metal nose 62 having a ram type inlet 64. As the airplane travels through the air, the impingement of the air upon the valve member 46 tends to move this valve member backwardly and compress spring 54 commensurate with the speed at which the plane is travelling and the weight or density of the air through which the plane is moving so that a uniform amount of air is admitted despite changes in speed and altitude. This valve is disclosed and claimed in the application of William A. Marshall, Jr., Serial No. 577,377, filed February 12, 1944, now U. S. Patent 2,451,621.

In the embodiment of Figure 3 a size of air inlet valve is selected which provides a larger quantity of air than is needed for combustion of the fuel delivered by the nozzle 26. The multiplicity of openings 30 are preferably so designed as to afford only sufficient air to insure complete combustion of the fuel delivered by the nozzle 26 and the excess air enters the cylinder 20 through a second series of openings 66 spaced lengthwise of the cylinder 20 from the openings 30. The excess air entering through the openings 66 dilutes the products of combustion discharged from the combustion chamber, and reduces the temperature thereof below the ignition point of the oil which is used for producing the smoke screen.

Somewhat beyond or to the right of the excess air openings 66 are a series of oil spray nozzles 68 which discharge oil into the products of combustion cooled by the secondary or excess air. The nozzles 68 are illustrated as being equally spaced in a circumferential direction about the cylinder 20 for the purpose of giving a substantially uniform distribution of oil throughout the products of combustion flowing lengthwise in the cylinder 20. While these products of combustion have been cooled below the ignition temperature of the oil by the entrance of the secondary air, these products of combustion are hot enough to vaporize the oil. In the embodiment shown in this figure, the several nozzles 68 are supplied with oil by a common pump P' connected by pipe 70 with a suitable reservoir.

It will be understood that the right hand end of the cylinder 20 is preferably curved as indicated by reference numeral 18 in Figure 1 although other shapes may be selected as desired. As the hot vaporized oil issues from the outlet of this curved portion 18 and comes in contact with the relatively cold atmosphere, the vaporized oil condenses into droplets and creates a suitable and effective smoke screen. My novel generator is not affected by variations in the operating conditions of the aircraft engine and being entirely independent of this engine, lends itself to accurate and precise control under all conditions of aircraft operation to provide a smoke screen of uniform quality and maximum intensity for a given size of generator.

In Figure 4 I have shown a somewhat modified and preferred form of smoke screen generator. This embodiment of my invention preferably uses an inlet valve identical with the valve 42 of the previous embodiment except that in the modification of Figure 4 a somewhat smaller air valve is used to deliver only sufficient air to insure complete combustion of the fuel delivered to the combustion chamber 24' by the nozzle 26. In Figure 4 the member 20' has only one group of air inlets 30' and these inlets are arranged to supply only combustion air for burning the fuel delivered by the nozzle 26.

The oil is sprayed into the hot products of combustion leaving the combustion chamber 24 by oil nozzles 68' which are illustrated as being arranged in two circumferential series. The products of combustion are above the ignition temperature of the oil delivered by the nozzles 68' and any unburned air present will burn a corresponding amount of the oil delivered by the nozzles 68'. The remaining oil will be vaporized and the mixture of combustion products and vaporized oil will be discharged to atmosphere through the curved outlet 18'. As soon as the vaporized oil strikes the relatively cool atmposhere, this oil will condense into droplets and form an efficient smoke screen.

In the embodiment of Figure 4 very little, if any, excess air is delivered to the combustion chamber so that the quantity of oil burned is held to a minimum. In order to prevent combustion of the oil when it strikes the atmosphere, the quantity of oil delivered by the nozzles 68' is sufficient to reduce the temperature of the admixture of vaporized oil and combustion products below the combustion temperature of the oil.

It will be understood that my invention is not limited to the particular details shown and described, but may assume numerous other forms and that my invention includes all variations and modifications coming within the appended claims.

I claim:

1. A smoke screen generator for aircraft, comprising a combustion chamber, a nozzle for supplying fuel to said chamber, a ram for supplying air to said chamber when the aircraft is in motion, means for controlling said air supply to deliver a uniform amount of air for all operating speeds and altitudes of the aircraft, means for introducing oil into products of combustion discharged from said combustion chamber, and means for introducing air into said products of combustion to cool said products of combustion below the ignition temperature of the oil prior to introducing the oil thereinto.

2. A smoke screen generator for a vehicle, comprising a cylinder forming a combustion chamber, means for supplying fuel to said combustion chamber, a ram for supplying air to said combustion chamber, a control valve for maintaining a uniform air supply despite variations in vehicle speed and operating altitude, means for igniting fuel delivered to said combustion chamber, means for spraying a combustible, smoke-producing material into products of combustion leaving said combustion chamber, means for introducing excess air into said products of combustion to lower the temperature of said products of combustion below the ignition temperature of said material, and means providing an outlet through which the admixture of products of combustion, excess air, and smoke-producing material are delivered to atmosphere.

3. A smoke screen generator for aircraft, comprising means providing a combustion chamber, means for supplying fuel and air thereto, means for initiating combustion in said combustion chamber, means for introducing a smoke-producing liquid into the products of combustion created in said combustion chamber for vaporization thereby, means for attaching said generator to an aircraft, and a shield interposed between said generator and aircraft to reduce heat radiation from said generator to said aircraft.

4. A smoke screen generator of the class described comprising a tubular member having a closed cylindrical end forming a combustion chamber and a curved outlet end communicating with atmosphere, means for delivering fuel and air to said combustion chamber, means for igniting the fuel and a quantity of air not appreciably in excess of the quantity required to burn said fuel efficiently in said chamber to produce products of combustion which are discharged from said tube through said outlet end, and nozzles interposed between said combustion chamber and outlet end for delivering liquid, smoke-producing material into said products of combustion in sufficient quantities to reduce the temperature of the admixture below the ignition temperature of said material.

5. A smoke screen generator of the class described, comprising a tube having a closed cylindrical end forming a combustion chamber and a curved outlet end through which products of combustion formed in said chamber are discharged to atmosphere, means for supplying fuel and air to said combustion chamber to produce a combustible mixture therein, means for igniting said mixture, means intermediate said combustion chamber and outlet end for introducing a cooling medium into the products of combustion leaving said combustion chamber to reduce the temperature thereof, and means for introducing a combustible, smoke-producing material into said tube between said last named means and said outlet end.

6. A smoke screen generator for aircraft, comprising a combustion chamber, a nozzle for delivering fuel to said chamber, a ram for supplying air to said chamber when the aircraft is in motion, means for controlling said air supply to deliver a uniform amount of air for all operating speeds and altitudes of the aircraft, a plurality of spaced nozzles for introducing oil into products of combustion discharged from said combustion chamber, and means for introducing a cooling medium into said products of combustion to cool said products of combustion below the ignition temperature of the oil prior to introducing the oil thereinto.

7. A smoke screen generator for aircraft, comprising a tubular member, means other than an aircraft engine for supplying hot products of combustion to said tubular member, means for introducing a combustible smoke-producing material into said products of combustion, said tube having a discharge outlet through which said products of combustion are discharged to atmosphere, and means for introducing a cooling medium into said products of combustion to prevent combustion of said smoke-producing material while in said tube and after discharge to atmosphere.

8. The method of creating an oil fog comprising the steps of introducing a stream of a fuel air mixture into a burner, burning said mixture in said burner to create products of combustion having a temperature higher than the flashpoint of the fog oil, introducing cool air into said combustion products to cool said combustion products below the flashpoint of said fog oil and increase their volume, introducing said fog oil into the stream of mixed air and combustion products such that the fog oil is vaporized, and emitting the mixture of air, combustion products and fog oil into the atmosphere causing the mixture to cool and the fog oil to condense as droplets.

9. The method of creating an oil fog comprising the steps of introducing a stream of fuel air mixture into a burner, burning said mixture in said burner, the ratio of the air in said mixture being such that the oxygen therein is nearly completely exhausted in the combustion, the combustion products having a temperature above the flashpoint of the fog oil, introducing said fog oil into the stream of combustion products whereby the mixture of combustion products and fog oil is caused to cool by the vaporization of the fog oil and emitting the mixture of combustion products and fog oil into the atmosphere wherein the fog oil vapor condenses into droplets.

10. A smoke screen generator for aircraft comprising means forming a combustion chamber, means for supplying fuel to said chamber, means for supplying air for combustion to said chamber when the aircraft is in motion, means for introducing oil into the products of combustion discharged from said combustion chamber, and means for introducing additional air into said products of combustion to cool said products of combustion below the ignition temperature of the oil prior to introducing the oil thereinto.

LYNN A. WILLIAMS, Jr.

REFERENCES CITED

The following references are of record in the file of this patent:

UNITED STATES PATENTS

| Number | Name | Date |
| --- | --- | --- |
| 818,256 | Kemp | Apr. 17, 1906 |
| 1,106,965 | Palmer | Aug. 11, 1914 |
| 1,296,226 | Stow | Mar. 4, 1919 |
| 1,665,267 | Jernberg | Apr. 10, 1928 |
| 2,048,997 | Collins | July 28, 1936 |
| 2,070,038 | Batt | Feb. 9, 1937 |
| 2,154,002 | Kerrick | Apr. 11, 1939 |
| 2,173,756 | Kronenberg | Sept. 19, 1939 |
| 2,418,098 | Ruff | Mar. 25, 1947 |

FOREIGN PATENTS

| Number | Country | Date |
| --- | --- | --- |
| 799,422 | France | Apr. 4, 1936 |
| 832,933 | France | July 11, 1938 |